US012240005B2

(12) United States Patent
Yao

(10) Patent No.: US 12,240,005 B2
(45) Date of Patent: Mar. 4, 2025

(54) SPRAY HEAD

(71) Applicant: Phoenix Industries Pty Ltd, Bayswater (AU)

(72) Inventor: Pengyuan Yao, Bayswater (AU)

(73) Assignee: Phoenix Industries Pty Ltd, Victoria (AU)

( * ) Notice: Subject to any disclaimer, the term of this patent is extended or adjusted under 35 U.S.C. 154(b) by 1094 days.

(21) Appl. No.: 16/977,652

(22) PCT Filed: May 7, 2019

(86) PCT No.: PCT/AU2019/050420
§ 371 (c)(1),
(2) Date: Sep. 2, 2020

(87) PCT Pub. No.: WO2019/213701
PCT Pub. Date: Nov. 14, 2019

(65) Prior Publication Data

US 2021/0362168 A1 Nov. 25, 2021

(30) Foreign Application Priority Data

May 7, 2018 (AU) ................................ 2018901544

(51) Int. Cl.
*B05B 1/18* (2006.01)
*B05B 1/04* (2006.01)

(52) U.S. Cl.
CPC .............. *B05B 1/185* (2013.01); *B05B 1/044* (2013.01)

(58) Field of Classification Search
CPC ........... B05B 1/18; B05B 1/185; B05B 1/044; B05B 1/06; B05B 1/04; B05B 1/02; E03C 1/086; E03C 1/08
See application file for complete search history.

(56) References Cited

U.S. PATENT DOCUMENTS 2,069,733 A 2/1937 Zinkil
2010/0072307 A1* 3/2010 Hester ........................ B05B 1/08 239/589.1
2014/0110504 A1* 4/2014 Honeyands ........... B05B 7/0892 239/418
2015/0048184 A1 2/2015 McCutcheon
(Continued)

FOREIGN PATENT DOCUMENTS

CN 201632337 U 11/2010
CN 104511378 A 4/2015
CN 204412487 U 6/2015
(Continued)

OTHER PUBLICATIONS

International Search Report and the Written Opinion of the International Searching Authority dated Jun. 24, 2019 for App. No. PCT/AU2019/050420.
(Continued)

*Primary Examiner* — Christopher R Dandridge
(74) *Attorney, Agent, or Firm* — Ryan T. Grace; Advent, LLP

(57) ABSTRACT

The present disclosure provides a spray head comprising an inlet for receiving fluid and a plurality of nozzles in fluid communication with the inlet, wherein each one of the plurality of nozzles is adapted to produce, when in use, a continuous jet of fluid having an elongate transverse cross-section.

18 Claims, 13 Drawing Sheets

(56) References Cited

U.S. PATENT DOCUMENTS

| | | | | |
|---|---|---|---|---|
| 2016/0059243 | A1* | 3/2016 | Parisi-Amon | B05B 1/18 239/444 |
| 2018/0071755 | A1* | 3/2018 | Romero | B05B 1/3421 |

FOREIGN PATENT DOCUMENTS

| | | | |
|---|---|---|---|
| CN | 107149991 | A | 9/2017 |
| EP | 1647333 | A1 | 4/2006 |
| WO | 2010036372 | A1 | 4/2010 |
| WO | 2011039647 | A2 | 4/2011 |
| WO | 2016032684 | A1 | 3/2016 |
| WO | 2017192704 | A1 | 11/2017 |

OTHER PUBLICATIONS

Office Action in China for Application No. 201980020456.5, dated Sep. 14, 2022.

Patent examination report 1 in New Zealand for Application No. 767637, dated Jan. 16, 2023.

Patent examination report 2 in New Zealand for Application No. 767637, dated Feb. 23, 2023.

Office Action in Canada for Application No. 3,097,918, dated Aug. 28, 2023.

* cited by examiner

SPRAY HEAD

FIELD OF THE INVENTION

The present invention relates to spray heads. More particularly, although not exclusively, the invention relates to spray heads in the form of shower heads.

BACKGROUND OF THE INVENTION

Shower heads typically comprise a housing having a plurality of nozzles in a lower surface thereof that, when in use, produce a stream of water droplets. One such shower head is disclosed in international (PCT) patent publication no. WO 2013/141719. However, a problem of prior shower heads is that they may not produce a satisfying spray of water droplets at low flow rates.

An object of the present invention is to provide a spray head and/or a shower head that overcomes, or at least ameliorates, one or more problems of prior spray heads/shower heads, or at least provides a useful alternative choice.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In an aspect, the present invention provides a spray head comprising:

an inlet for receiving fluid; and a plurality of nozzles in fluid communication with the inlet;

wherein each one of the plurality of nozzles is adapted to produce, when in use, a continuous jet of fluid having an elongate transverse cross-section.

In an embodiment, each nozzle preferably has elongate transverse cross-section having a major axis of a first length and a minor axis of second length, wherein the first length is greater than the second length. The major axis preferably corresponds to a longitudinal axis of the nozzle, and the minor axis preferably corresponds to a transverse axis of the nozzle. In a preferred embodiment, the elongate transverse cross-section may be generally in the form of a rhombus. The rhombus may have curved vertices. Alternatively, the elongate transverse cross-section may be in the form of an ellipse or other similar shape.

In an embodiment, each nozzle defines a nozzle opening that is preferably outwardly curved (or convex) with respect to a base of the spray head.

The elongate transverse cross-section of the nozzle and the outwardly curved nozzle opening are, together, adapted to produce, when in use, the continuous jet of fluid having an elongate transverse cross-section. The jet of fluid is "continuous" in the sense that it is a substantially integral body of fluid. The nozzle is preferably configured such that the body of fluid does not disintegrate into discrete droplets until approximately 30 mm from the base of the spray head.

The continuous jet of fluid having an elongate transverse cross-section may splay outwardly from the nozzle opening. The jet of fluid may therefore appear generally "bell" shaped in side cross-section. The spray head may include a recess disposed about each nozzle opening, which recess is configured to define a splay angle of the jet of fluid.

The recess preferably extends into the base of the spray head about the outwardly curved nozzle opening such that the nozzle opening is at least partially inset from the base. The recess preferably includes a base, a first pair of opposite sides extending from the base, and a second pair of opposite sides extending from the base. The first pair of opposite sides is preferably generally perpendicular to the major axis of the nozzle cross-section, and the second pair of opposite sides is preferably generally parallel to the major axis of the nozzle cross-section. The first pair of sides may diverge outwardly towards the base of the spray head from a position approximately adjacent opposite ends of the nozzle opening. The outwardly diverging first pair of sides may therefore define the splay angle of the jet of fluid. The splay angle may vary between approximately 22° to 46°.

In an embodiment, each one of the plurality of nozzles may include a nozzle wall that extends from adjacent the base of the recess to define the nozzle opening. Preferably, the nozzle opening is outwardly curved (or convex) with respect to the base of the recess, such that the nozzle wall has a maximum height, relative to the base of the base recess, at a longitudinal and transverse centre of the nozzle opening, the nozzle wall gradually decreasing in height outwardly of the longitudinal and transverse centre. Preferably, the nozzle wall has a minimum height, relative to the base of the recess, at opposite longitudinal ends of the nozzle opening. The nozzle wall preferably defines an edge surrounding the nozzle opening. The edge is preferably configured to reduce or prevent fluid dripping from the nozzle when not in use. In one embodiment, the edge may include a hydrophobic coating that may assist in reducing or preventing fluid dripping from the nozzle.

Each one of the plurality of nozzles may be inclined slightly inwardly toward a centre of the base of the spray head at an angle of inclination of between approximately 6.5° to 11°.

The spray head may include a plurality of fluid conduits in fluid communication with the inlet. Each one of the plurality of fluid conduits may further be in fluid communication with a respective one of the plurality of nozzles. The spray head may have a generally circular transverse cross-section, and the inlet may be located at or near a centre of the spray head. Alternatively, the inlet may be located at or near an end of the spray head. The plurality of fluid conduits may extend generally radially outwardly from the inlet and may be disposed equidistantly from one another. The plurality of nozzles may be disposed circumferentially about the base and may be disposed equidistantly from one another. The spray head may include between twelve and sixteen nozzles. In a preferred embodiment, the spray head includes fifteen nozzles disposed equidistantly about the base and a corresponding fifteen fluid conduits, each fluid conduit being configured to deliver fluid from the inlet to a respective one of the nozzles.

Each one of the plurality of fluid conduits may include at least a first conduit section, a second conduit section, and a third conduit section. The first conduit section may be downstream of the inlet and may have a generally constant cross-section. The generally constant cross-section may be circular in form. The second conduit section may be downstream of the first conduit section and may have a converging cross-section, which converging cross-section converges toward the third conduit section. The converging cross-section of the second conduit section is configured to accelerate the flow to the third conduit section. The third conduit section may be downstream of the second conduit section and may have a diverging cross-section which diverges along at least a portion of a length of the third conduit section from a first end to a second end thereof. The third conduit section may have a longitudinal axis that is approximately perpendicular to a longitudinal axis of the second conduit section. The third conduit section preferably defines the nozzle, and the nozzle opening preferably terminates the third conduit section.

In an alternative embodiment, the spray head may include a plurality of fluid conduits in fluid communication with the inlet, each conduit configured to also be in fluid communication with a respective one of the plurality of nozzles. Preferably, there may also be provided a plurality of nozzle bodies, wherein each nozzle body is connectable to a respective one of the plurality of fluid conduits. Each nozzle body preferably comprises a first conduit section, a second conduit section, and a third conduit section. The first conduit section preferably has a generally constant cross-section. The generally constant cross-section may be substantially circular in form. The second conduit section is preferably located downstream of the first conduit section, and preferably has a converging cross-section which converges toward the third conduit section. The third conduit section is preferably located downstream of the second conduit section, and preferably defines the nozzle opening. The third conduit section may have a diverging cross-section which diverges along at least a portion of a length of the third conduit section from a first end to a second end thereof, The third conduit section preferably has a longitudinal axis that is approximately perpendicular to a longitudinal axis of the second conduit section.

Each nozzle body is preferably removably insertable into a housing of the spray head so as to be connectable to a respective one of the plurality of fluid conduits. Each nozzle body is preferably press-fitted into the housing to be secured within the housing. Each nozzle body may include a stop on an outer surface thereof to restrict the body from moving with respect to the housing when the body is inserted therein.

The spray head described above is configured to produce the continuous jet of fluid with a water flow pressure at the inlet of approximately 150 kPa or higher.

The spray head described above may be in the form of a shower head. The spray head described above may also be in the form of a hand shower.

In another aspect, the present invention provides a nozzle body installable within a spray head, the nozzle body comprising an inlet for receiving fluid, and an outlet, wherein the nozzle body is adapted to produce, when in use, a continuous jet of fluid having an elongate transverse cross-section.

The nozzle body preferably comprises a first conduit section, a second conduit section, and a third conduit section. A first end of the first conduit section preferably includes the inlet. The inlet is adapted to be connected to a conduit located within the spray head so as to receive fluid therefrom. The first conduit section preferably has a generally constant cross-section. The generally constant cross-section may be substantially circular in form.

The first conduit section preferably transitions into the second conduit section at a second end of the first conduit section. The second conduit section is preferably located downstream of the first conduit section, and may have a converging cross-section which converges from a first end of the second conduit section to a second end of the second conduit section, which second end is located downstream of the first end. The converging cross-section of the second conduit section is configured to accelerate flow of fluid to the third conduit section.

The second conduit section preferably transitions into the third conduit section at the second end of the second conduit section. The third conduit section is preferably located downstream of the second conduit section, and may have a diverging cross-section which diverges from a first end of the third conduit section to a second end of the third conduit section, which second end is located downstream of the first end. The cross-section of third conduit section may be dimensioned so as to diverge outwardly along an entire length of the third conduit section between the first and second ends, or only along a portion of the entire length between the first and second ends. The second end of the third conduit section preferably includes the outlet. The outlet may also be referred to as the nozzle opening. The third conduit section may have a longitudinal axis that is approximately perpendicular to a longitudinal axis of the second conduit section.

The nozzle body is preferably removably insertable into a housing of the spray head so as to be connectable to the conduit located within the spray head.

The nozzle body is preferably press-fitted into the housing to be secured within the housing. The nozzle body may also include a stop on an outer surface thereof to restrict the body from moving with respect to the housing when the body is inserted therein.

The spray head may include a plurality of conduits configured to be connected to a plurality of nozzle bodies. The plurality of conduits preferably receive fluid from an inlet of the spray head, and deliver the fluid to the inlet of the nozzle body.

The nozzle body may include any one or more of the features described in relation to the first aspect of the invention. For example, the outlet may have an elongate transverse cross-section that is generally in the form of a rhombus, and the outlet may be outwardly curved (or convex). Additionally, the outlet may be defined by a nozzle wall that, relative to a base of the spray head, has a maximum height at a longitudinal and transverse centre of the outlet, the nozzle wall gradually decreasing in height outwardly of the longitudinal and transverse centre. Preferably, the nozzle wall has a minimum height at opposite longitudinal ends of the outlet.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

It will be understood that the invention disclosed and defined in this specification extends to all alternative combinations of two or more of the individual features mentioned or evident from the text or drawings. All of these different combinations constitute various alternative aspects of the invention.

Figure 1:
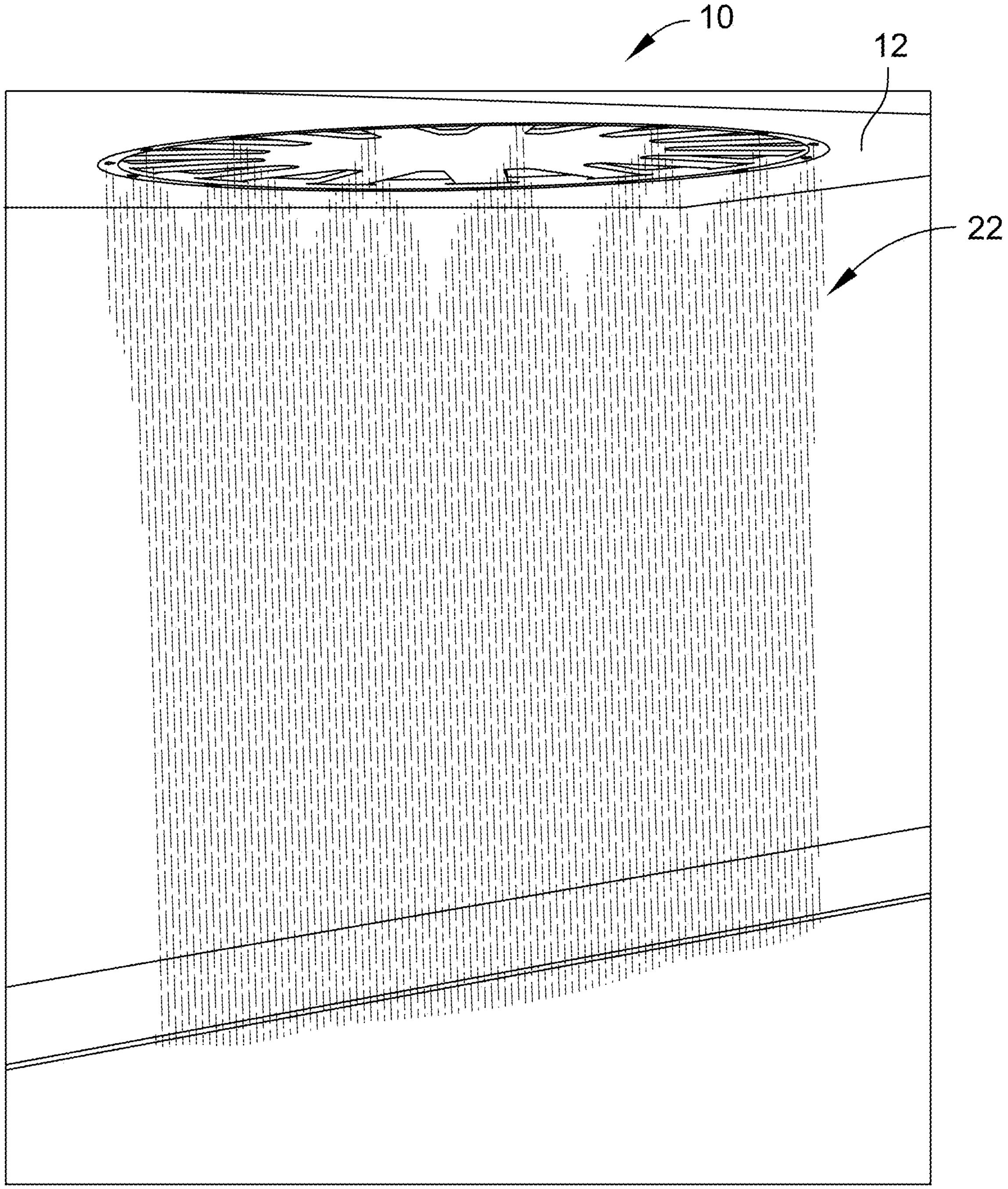
FIG. 1 is a photograph of a spray head in the form of a shower head according to a first embodiment of the invention.

Referring to FIG. 1, there is shown a photograph of a spray head according to a first embodiment of the present invention. The spray head is in the form of a shower head 10 for use in a shower, albeit the spray head described herein could alternatively be in the form of a hand shower or other similar spray head.

Figure 2:
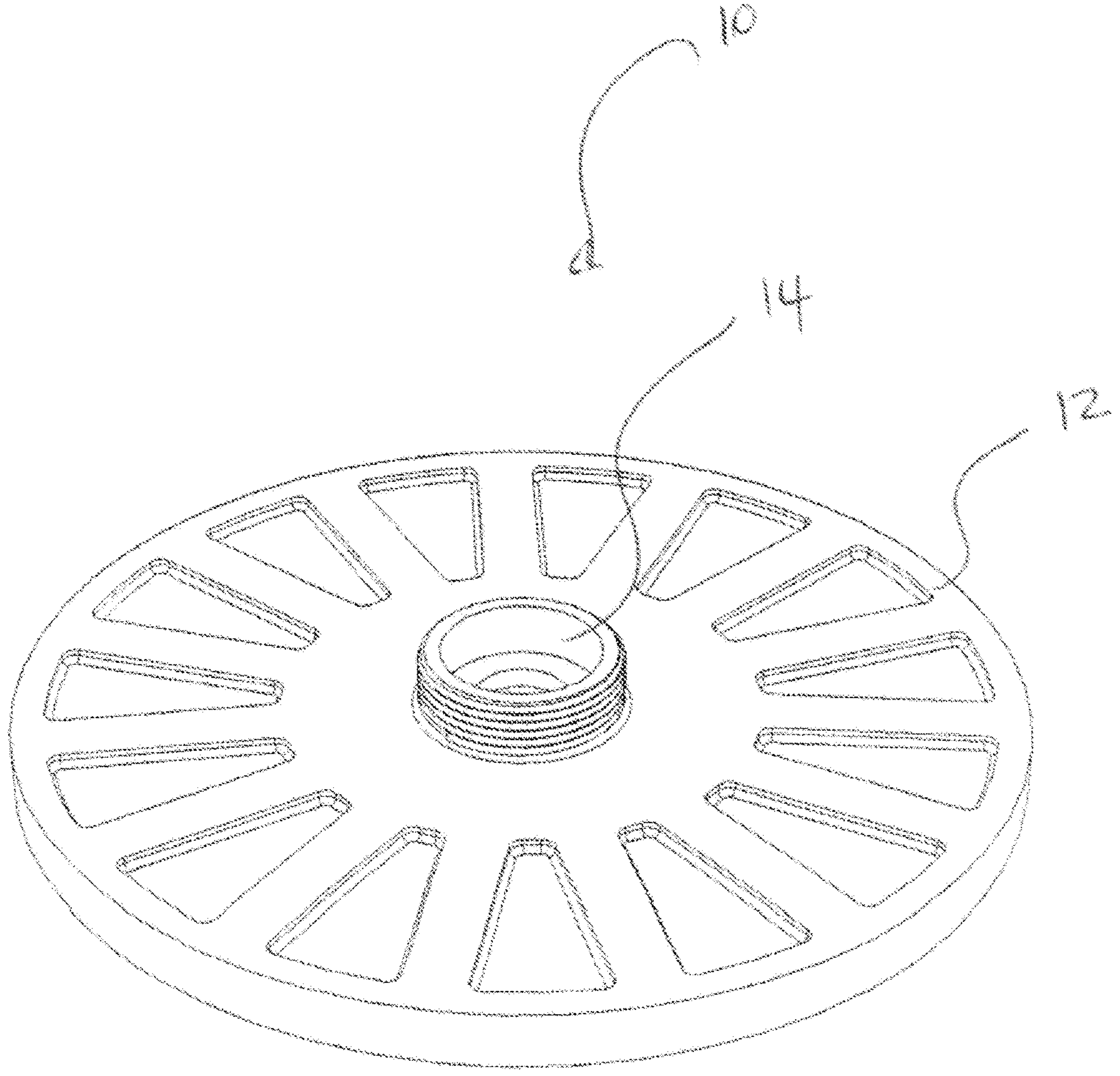
FIG. 2 is a top perspective view of a shower head similar to that shown in FIG. 1.

Referring to FIG. 2, the shower head 10 includes a generally cylindrical housing 12, a central inlet 14 for receiving fluid, typically water, from a fluid conduit connected to a water supply (not shown), and a plurality of nozzles 18 (FIG. 3) disposed in a base 20 of the housing 12. Each one of the plurality of nozzles 18 is adapted to produce, when in use, a continuous jet of fluid 22 (FIG. 1) having an elongate transverse cross-section. Each jet of fluid 22 is "continuous" in the sense that it is a substantially integral body of fluid.

As is shown in FIG. 1, each jet of fluid 22 splays outwardly from a respective nozzle 18 and therefore appears generally "bell" shaped in side cross-section. The nozzles 18 of the shower head 10 are configured such that each jet or body of fluid 22 does not disintegrate into discrete water droplets until approximately 30 mm from the base 20 of the spray head. It has been discovered that such a flow pattern produces a satisfying spray, even at low water flow rates.

Figure 3:
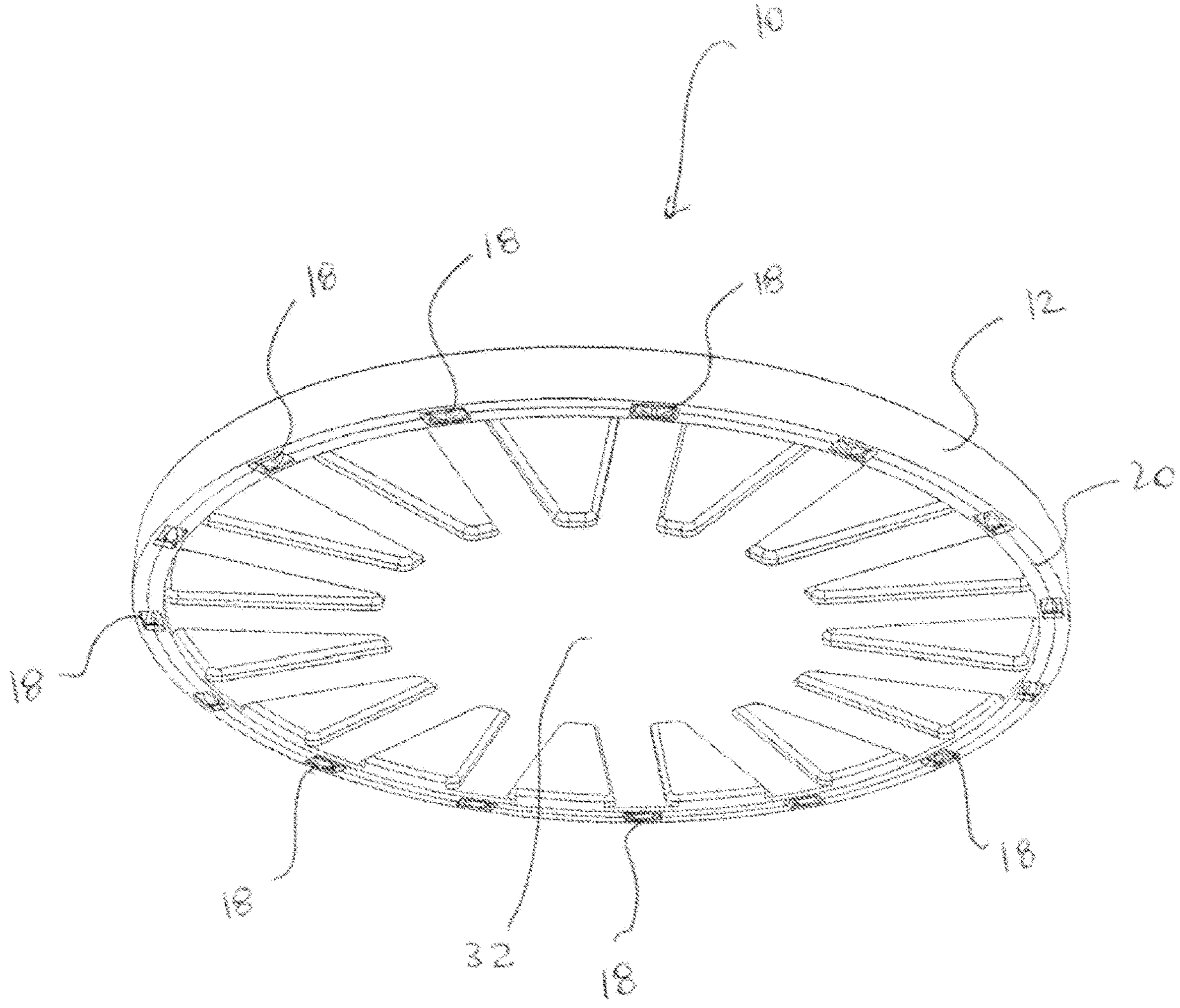
FIG. 3 is a bottom perspective view of the shower head of FIG. 2.

FIG. 2 is a top perspective view of the shower head 10 showing its generally cylindrical housing 12 and central inlet 14. FIG. 3 is a bottom perspective view of the shower head 10 showing the plurality of nozzles 18, which are circumferentially disposed equidistantly from one another about the base 20 of the housing 12. As shown in FIG. 3, the shower head 10 includes fifteen such nozzles 18. A skilled person will appreciate however that the number and arrangement of nozzles could be varied without departing from the scope of the present invention.

Figure 4A:
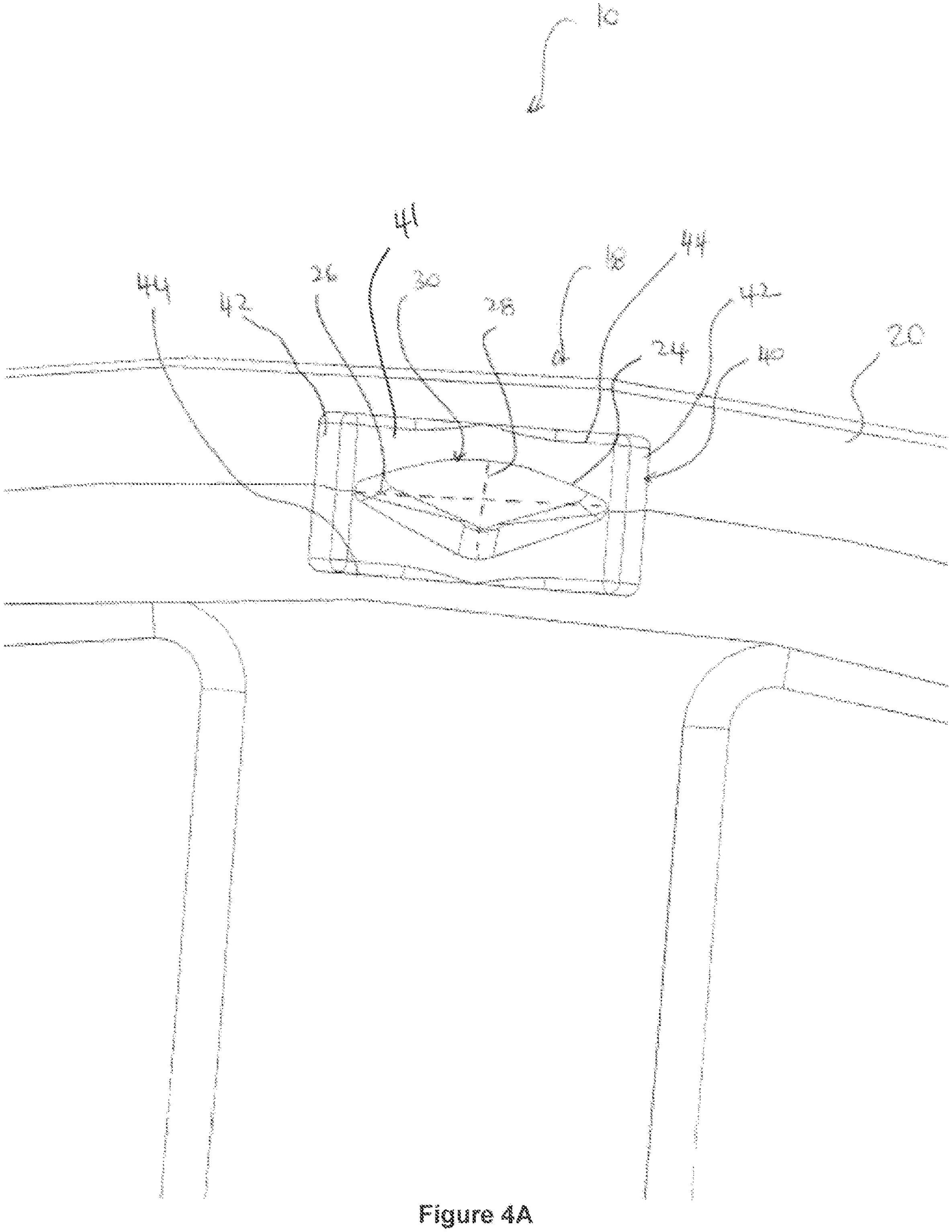
FIG. 4A is a close-up perspective view of a nozzle of the shower head of FIG. 2.

FIG. 4A is a close-up perspective view of a single nozzle 18 of the plurality of nozzles. Each nozzle of the plurality of nozzles 18 is of the same form and dimension. As is shown in FIGS. 4A and 4C, the nozzle 18 has an elongate transverse cross-section 24 generally in the form of a rhombus with curved vertices. The elongate transverse cross-section 24 defines a major (or transverse) axis 26 having a length of approximately 6.5 mm, and a minor axis 28 having a length of approximately 7.5 mm. A person skilled in the art would appreciate that these lengths are merely exemplary and that slight variations of these lengths would merely result in a change in a splay angle of the exiting fluid (described below).

Figure 4B:
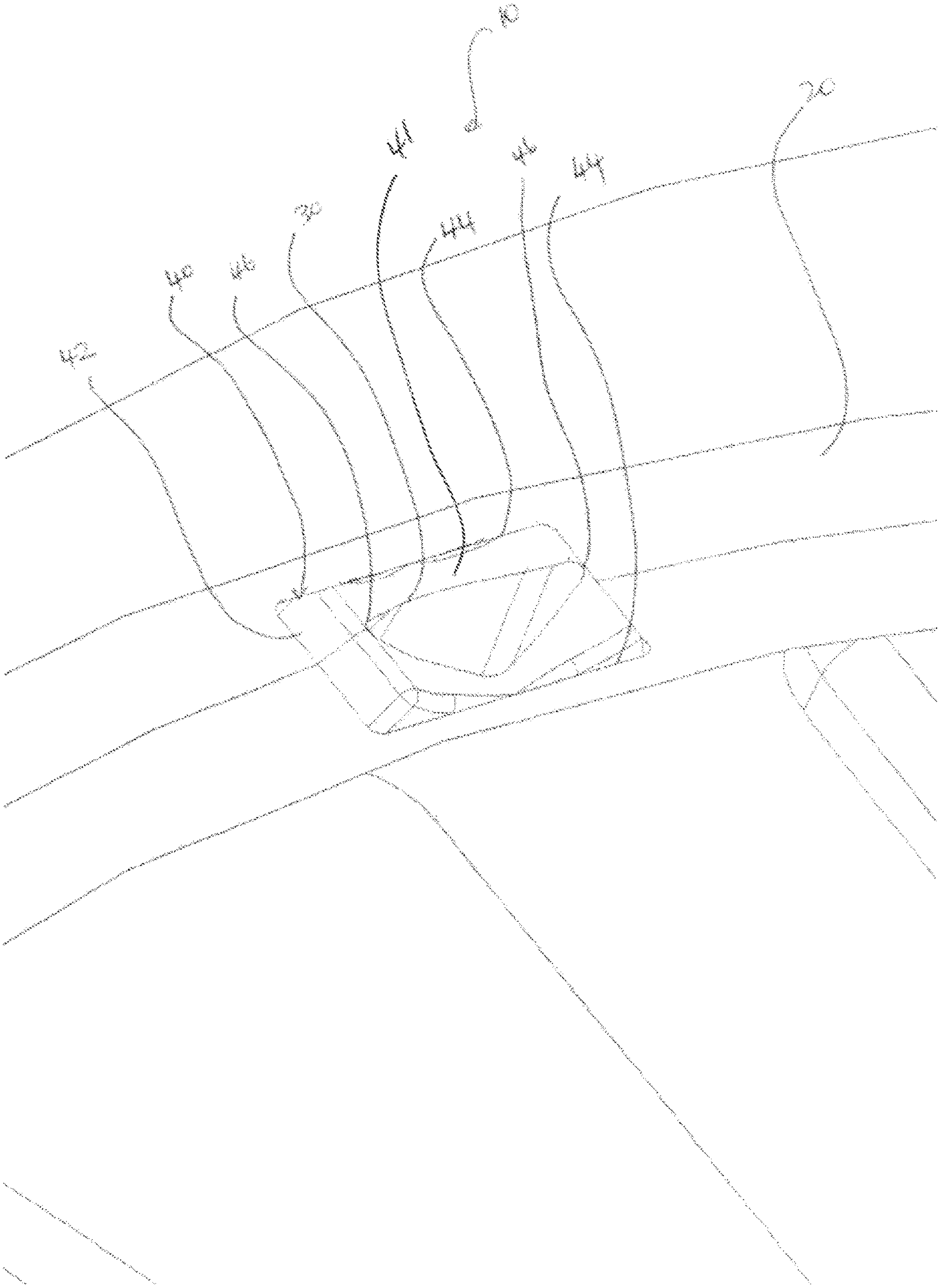
FIG. 4B is another close-up perspective view of the nozzle of FIG. 4A.
Figure 4C:
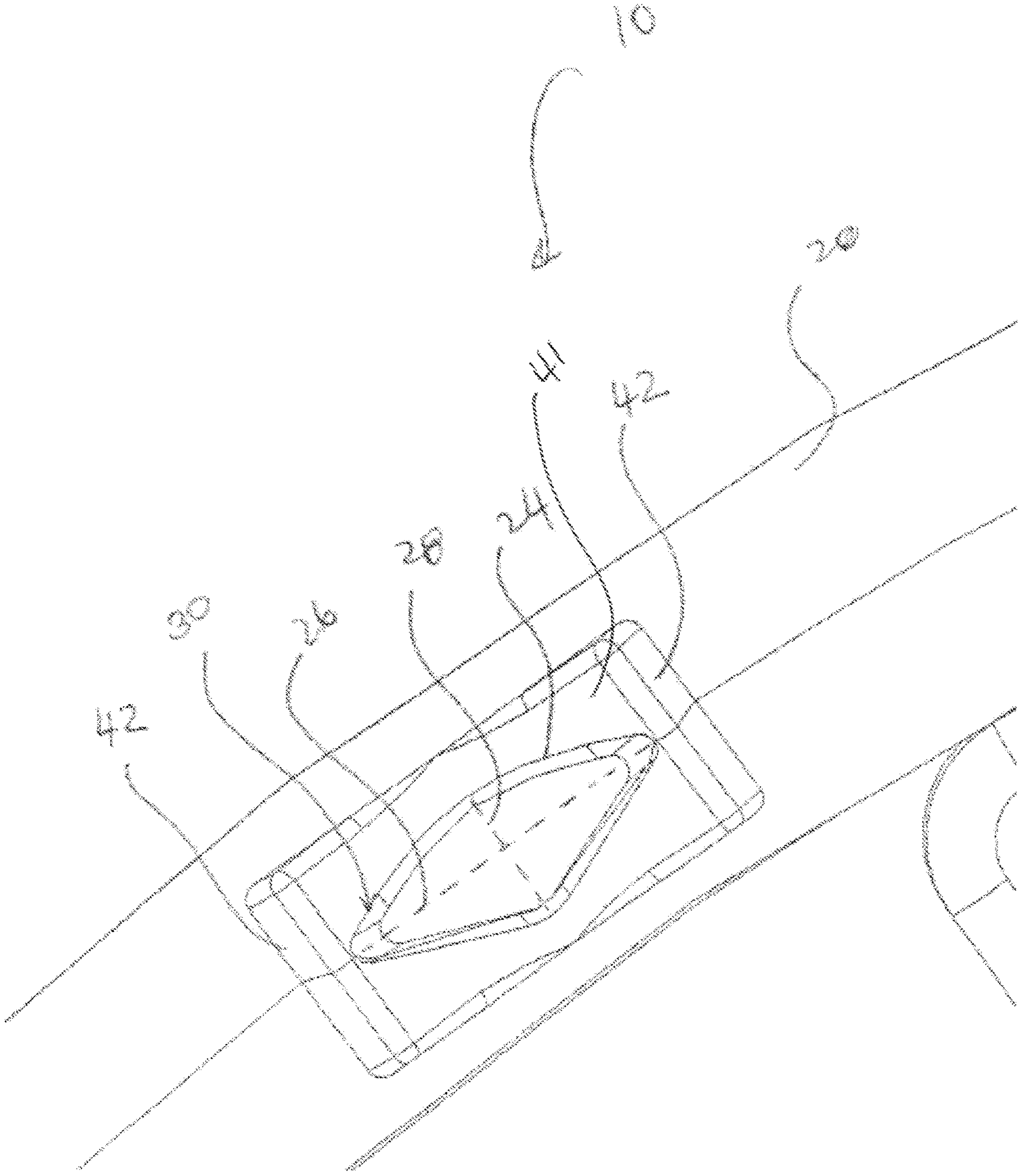
FIG. 4C is another close-up view of the nozzle of FIG. 4A.
Figure 4D:
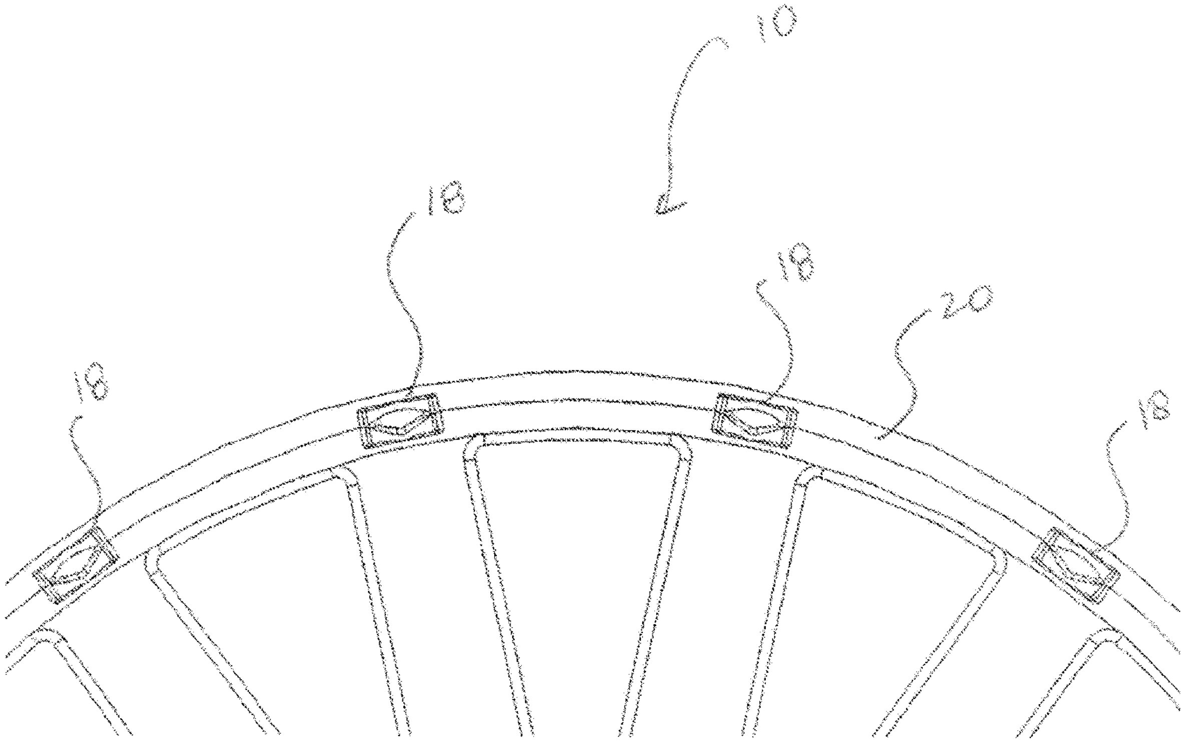
FIG. 4D is a close-up bottom view of a section of the shower head of FIG. 2.

As is more clearly shown in FIG. 4B, the nozzle 18 defines a nozzle opening 30 that is outwardly curved (or convex) in the major (or transverse) axis 26 with respect to the base 20 of the housing 12. Together, the elongate transverse cross-section 24 of the nozzle 18 and the outwardly curved nozzle opening 30 are adapted to produce, when in use, the continuous jet of fluid 22 having the likewise elongate transverse cross-section that appears generally in the form of a "bell" in side cross-section. As is shown particularly in FIG. 4D, each nozzle 18 is also inclined slightly inwardly toward a centre 32 (FIG. 1) of the base 20 of the shower head 10 at an angle of inclination of approximately 6.5°.

The shower head 10 further includes a recess 40 disposed about each nozzle opening 30. In the manner described below, the recess 40 is configured to define a splay angle of the jet of fluid 22 exiting the nozzle 18. As is shown in FIGS. 4A and 4B, the recess 40 extends into the base 20 about the outwardly curved nozzle opening 30. The recess 40 includes a base 41, a first pair of opposite sides 42 extending from the base 41, and a second pair of opposite sides 44 extending from the base 41. The first pair of opposite sides 42 is generally perpendicular to the major (or transverse) axis 26 of the nozzle 18 (and generally parallel to the minor axis 28). The second pair of opposite sides 44 is generally parallel to the major (or transverse) axis 26 of the nozzle 18 (and generally perpendicular to the minor axis 28). As is shown particularly in FIG. 4B, the first pair of opposite sides 42 diverge outwardly at a similar angle toward the base of the spay head 20 from a position approximately adjacent opposite longitudinal ends 46 of the nozzle opening 30. The outwardly diverging sides 42 thereby define a splay angle of the jet of fluid 22 emanating from the nozzle opening 30. The splay angle is approximately 46°. In an alternative non-illustrated embodiment of the spray head, the splay angle may be approximately 22°.

Figure 5:
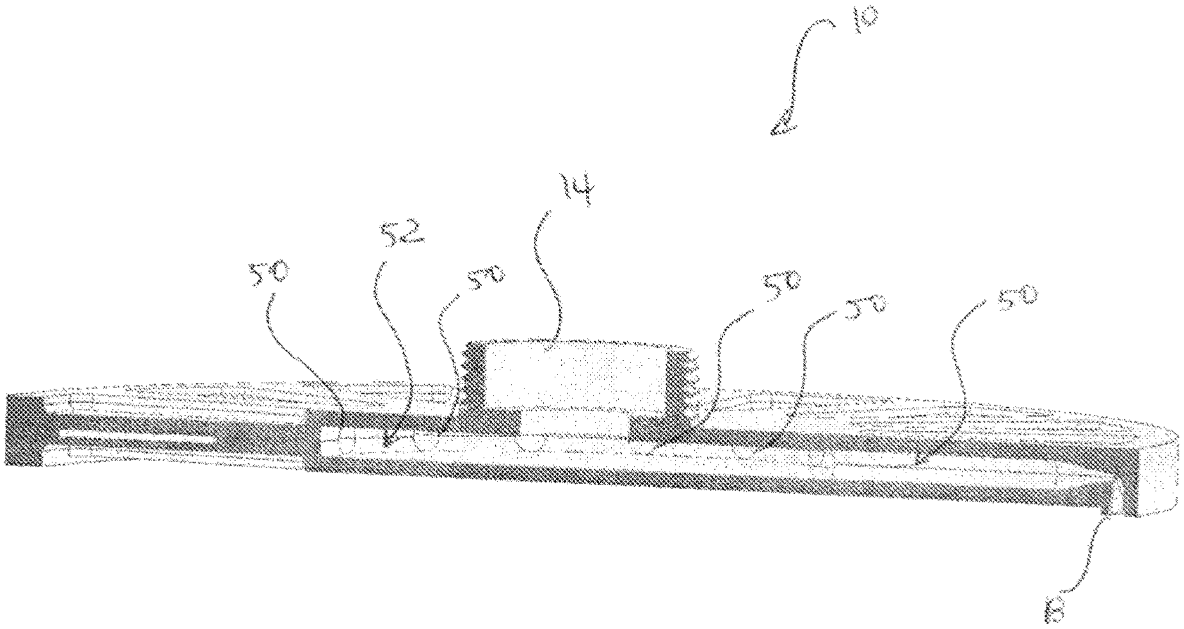
FIG. 5 is a cross-sectional view of the shower head of FIG. 2.

FIG. 5 is a cross-sectional view of the shower head 10 showing a plurality of fluid conduits 50 in fluid communication with the inlet 14 via a generally cylindrical inner chamber 52 disposed below the inlet 14 in the housing 12. Each one of the plurality of fluid conduits 50 is in fluid communication with a respective one of the plurality of nozzles 18. As such, water entering the inlet 14 via a water supply (not shown) is routed to the nozzles 18 via a respective fluid conduit 50. As is shown in FIG. 5, the plurality of fluid conduits 50 extend generally radially outwardly from the cylindrical inner chamber 52 and are disposed equidistantly from one another. The shower head 10 includes fifteen such fluid conduits 50.

Figure 6A:
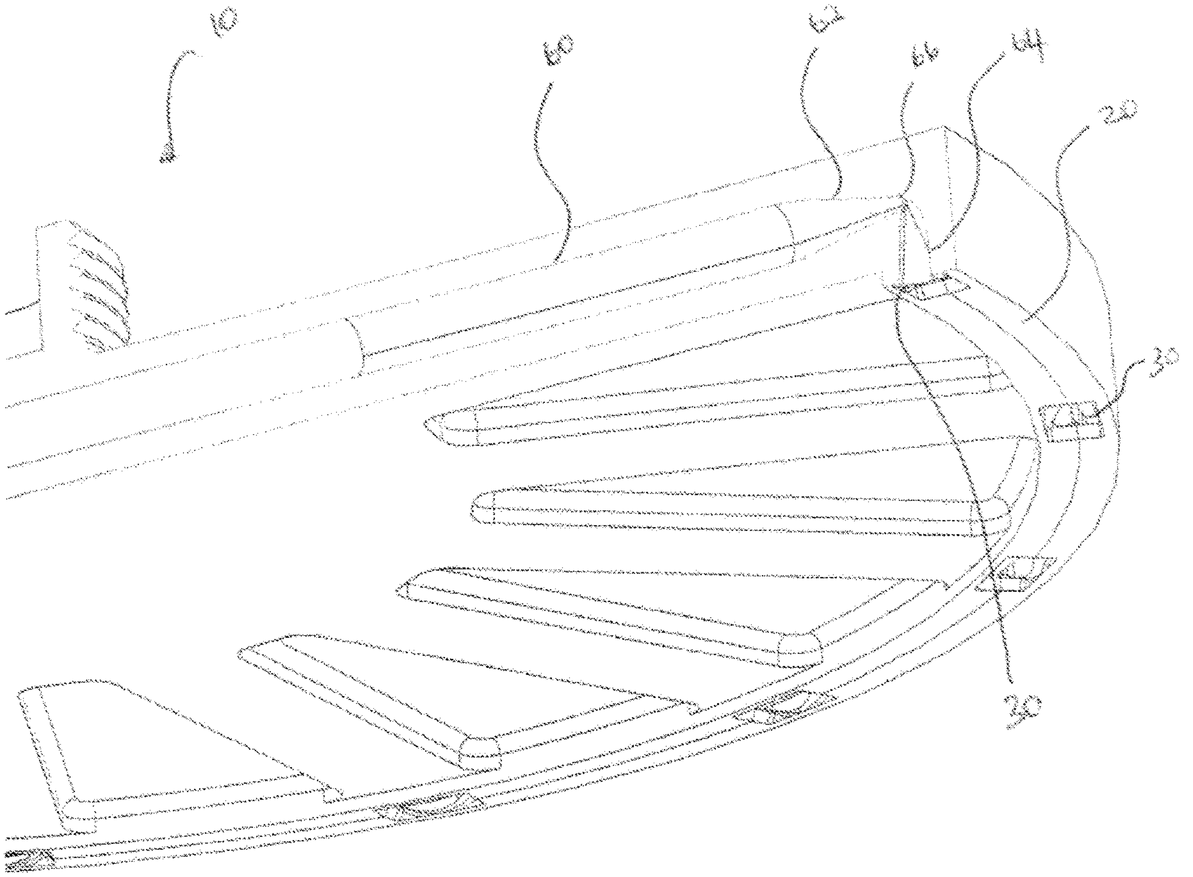
FIG. 6A is a partial cross-sectional view of the shower head of FIG. 2.
Figure 6B:
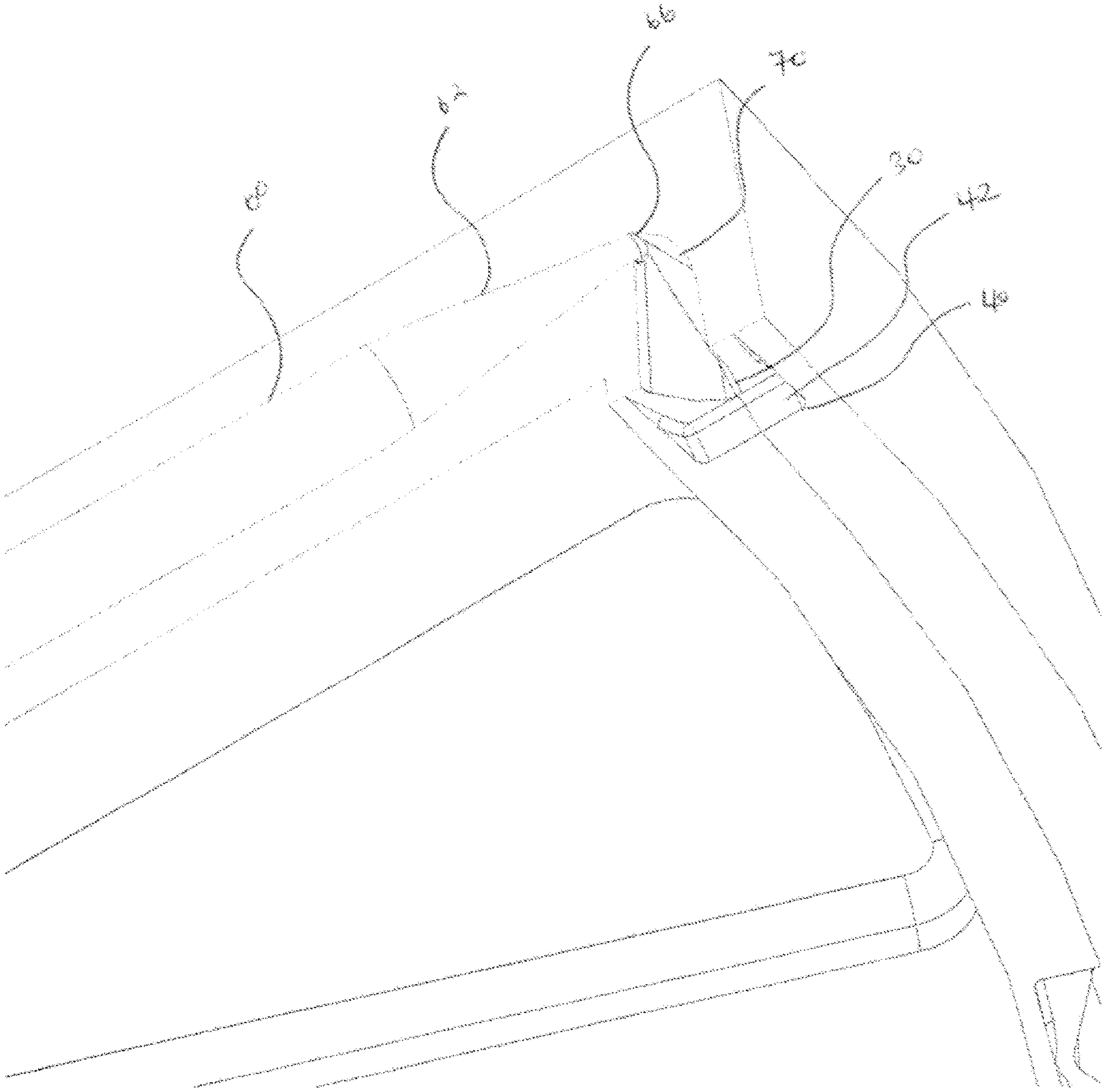
FIG. 6B is another partial cross-sectional view of the shower head of FIG. 2.

Referring to FIGS. 6A and 6B, each one of the fluid conduits 50 includes a first conduit section 60, a second conduit section 62 downstream of the first conduit section 60, and a third conduit section 64 downstream of the second conduit section 62, which third conduit section 64 defines the nozzle 18. In this context, "downstream" refers to a direction of fluid flow from the inlet 14 to a nozzle opening 30.

The first conduit section 60 has a constant circular cross-section with a diameter of approximately 4 mm and a first conduit length of approximately 41 mm. In an alternative non-illustrated embodiment of the spray head in the form of a hand shower, the first conduit length may be approximately 31 mm. The first conduit section 60 transitions into the second conduit section 62 at a downstream end thereof. The second conduit section 62 has a converging "cone-like" cross-section which converges downstream toward the third conduit section 64 and which is configured to accelerate the flow to the third conduit section 64 or nozzle 18. The second conduit section 62 has a second conduit length of approximately 8 mm. The second conduit section 62 transitions into the third conduit section 64 via a circular aperture 66 disposed at a downstream end thereof. The circular aperture 66 has a diameter of approximately 1 mm. The third conduit section 64 defines a longitudinal axis that is generally perpendicular to a longitudinal axis of the first and second conduit sections 60, 62.

The third conduit section 64 includes a curved outer water guide surface 70 which curves outwardly and downwardly from the circular aperture 66 toward the nozzle opening 30, and which is configured to guide water in the third conduit section 64 toward the nozzle opening 30. The nozzle opening 30 terminates the third conduit section 64.

The construction and arrangement of the first, second, and third fluid conduit sections 60, 62, 64, and in particular, the circular aperture 66 and the curved outer water guide surface 70 thereof, are such that a continuous body or jet of fluid is created at the nozzle opening 30, as opposed to a stream of discrete water droplets, which may occur in other shower heads of the prior art.

Figure 7:
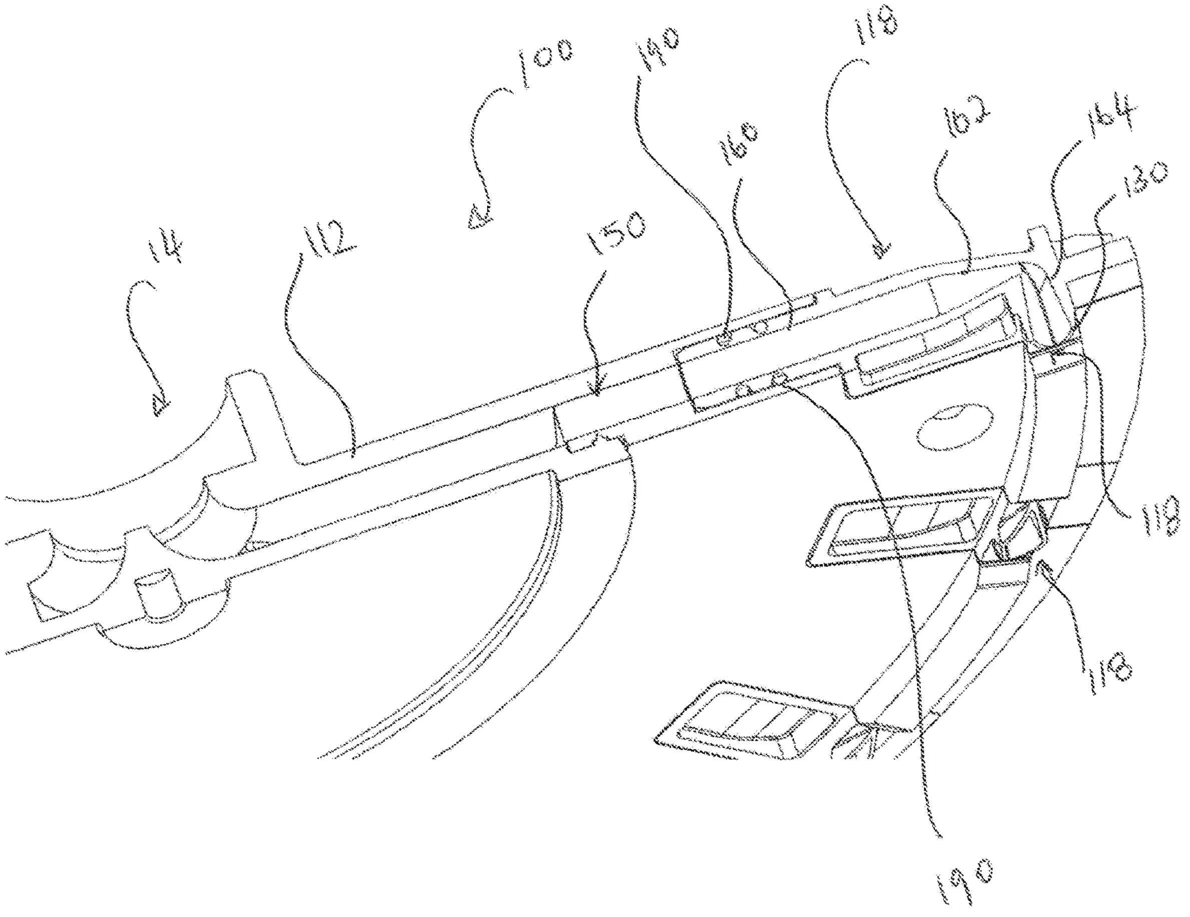
FIG. 7 is a cross-sectional view of a spray head in the form of a shower head according to a second embodiment of the invention.

FIGS. 7 and 8 illustrate a spray head according to a second embodiment of the invention. The spray head is in the form of shower head 100, albeit the spray head could alternatively be in the form of a hand shower or other similar spray head.

The shower head 100 is substantially similar to the shower head 10 illustrated in FIGS. 1 to 6, and includes substantially all of the features described above in relation to the shower head 10, but for the additional features described below.

The shower head 100 comprises a housing 112 that defines a plurality of fluid conduits 50 (one of which is shown in FIG. 7) that extend radially outwardly from the central inlet 114, and are disposed equidistantly from one another. The shower head 100 also includes a plurality of nozzle bodies 118, each of which is connectable to a respective one of the plurality of fluid conduits 150 so as to be in fluid communication therewith.

Each nozzle body 118 comprises a first conduit section 160, a second conduit section 162, and a third conduit section 164. The first conduit section 160 has a constant circular cross-section and is configured to be fluidly connected to the conduit 150. The first conduit section 160 transitions into the second conduit section 162 at a downstream end thereof. The second conduit section 162 has a converging "cone-like" cross-section which converges downstream toward the third conduit section 164, and which is configured to accelerate the flow to third conduit section 164. The third conduit section 164 is terminated by the nozzle opening 130. The third conduit section 164 defines a longitudinal axis that is approximately perpendicular to a longitudinal axis of the second conduit section 162.

Each nozzle body 118 is removably insertable into the housing 112 of the spray head 110 by being press-fitted therein. Each nozzle body 118 also includes a stop (not shown) on an outer surface thereof to restrict the body 118 from moving with respect to the housing 112 when the body 118 is inserted therein.

Figure 8A:
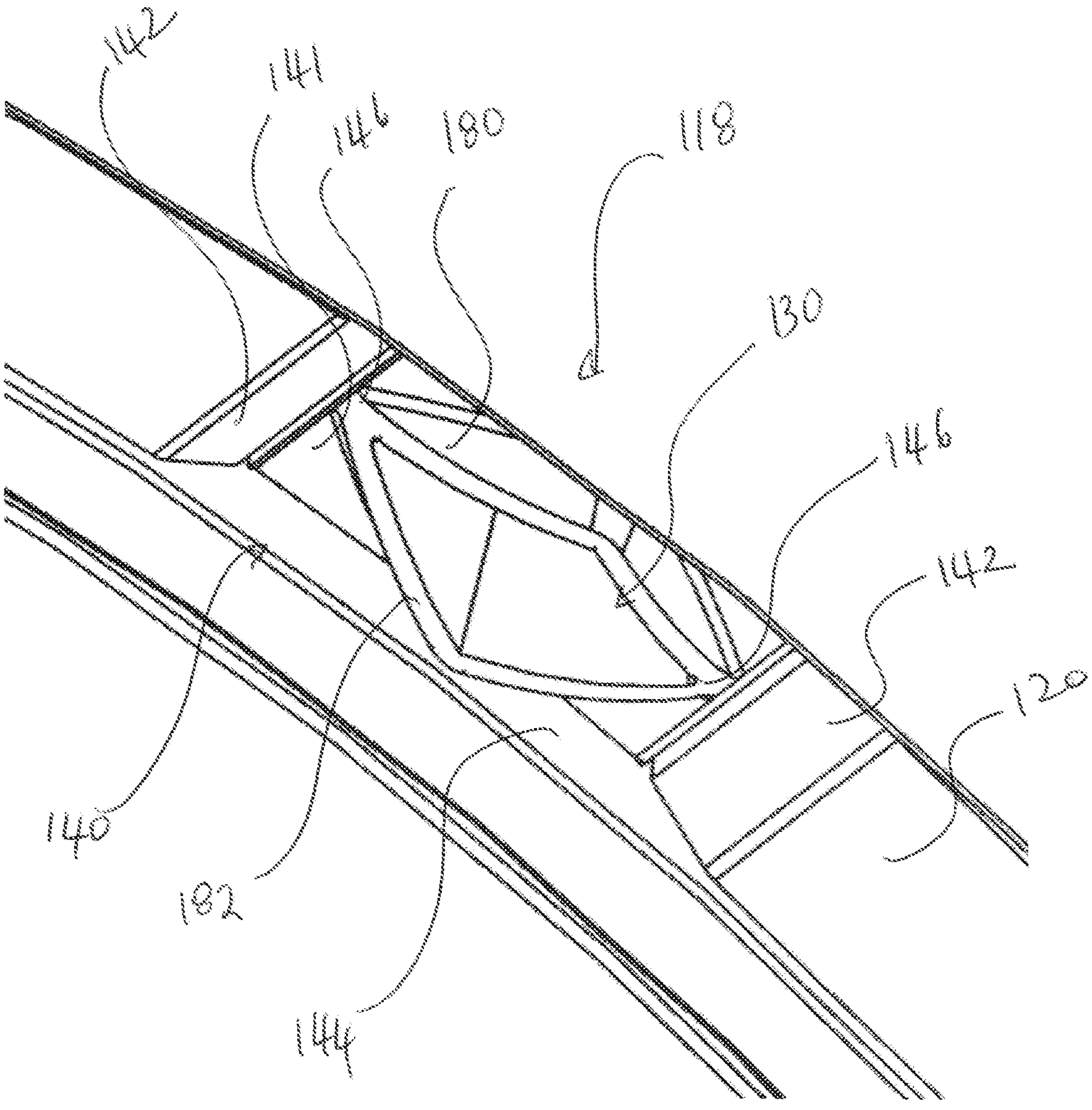
FIG. 8A is a close-up perspective view of a nozzle of the shower head of FIG. 7.
Figure 8B:
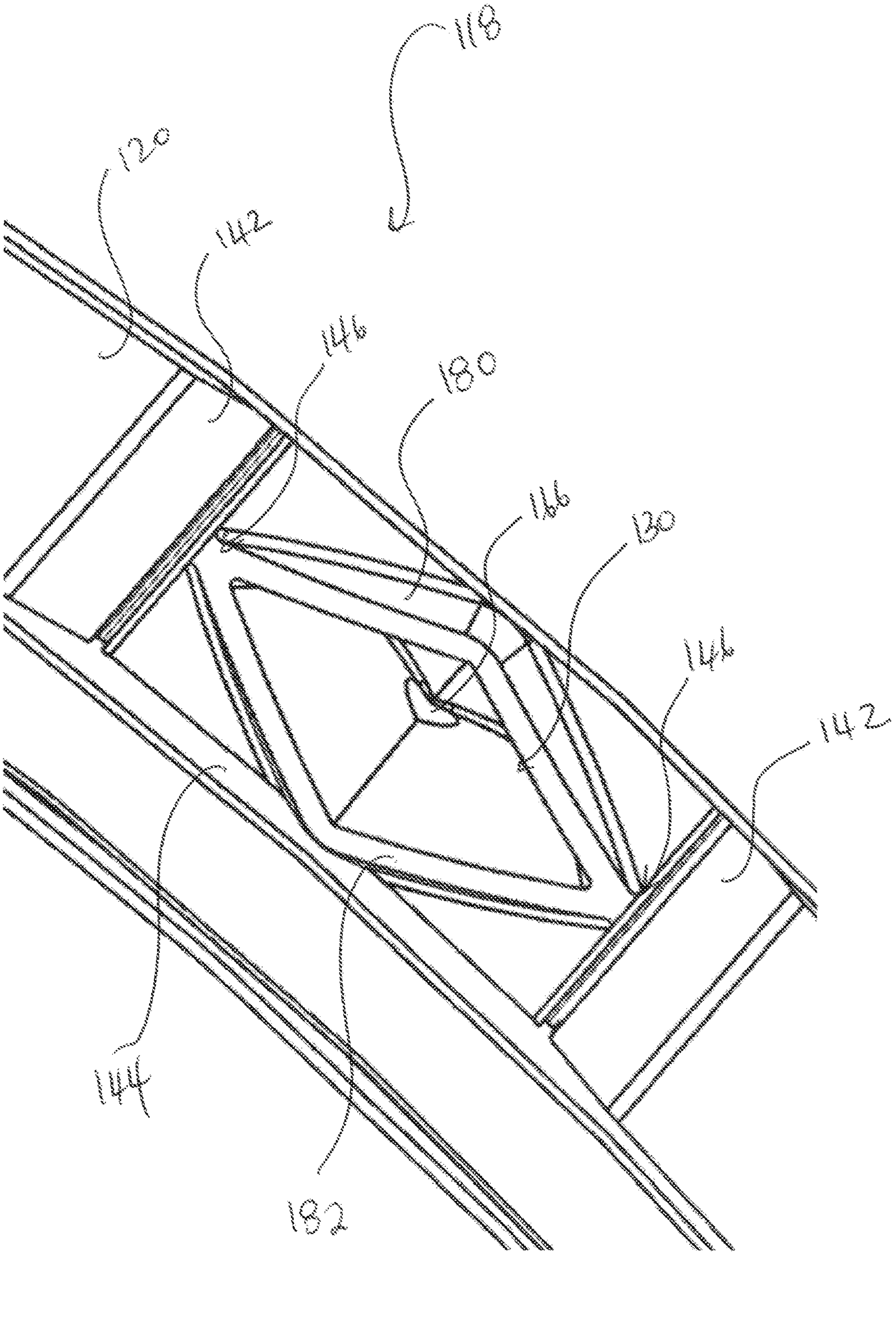
FIG. 8B is another close-up perspective view of the nozzle of FIG. 8A.

Referring to FIGS. 8A and 8B, it can be seen that the nozzle 118 is similar to the nozzle 18 in many respects, including in that the nozzle opening 130 has an elongate transverse cross-section generally in the form of a rhombus. The nozzle 118, however, includes a nozzle wall 180 that extends from adjacent the base 141 of the recess 140 to define the nozzle opening 130. Similar to the nozzle 18, the nozzle 118 has a nozzle opening 130 that is outwardly curved (or convex) with respect to the base 141 of the recess 140.

The nozzle wall 180 is configured such that it has a maximum height at a longitudinal and transverse centre of the nozzle opening 130. The nozzle wall 180 gradually decreases in height outwardly of the longitudinal and transverse centre such that the nozzle wall 180 has a minimum height at opposite longitudinal ends 146 of the nozzle opening 130. The nozzle wall 180 defines an edge 182 surrounding the nozzle opening 180. The edge 182 is configured to reduce or prevent fluid dripping from the nozzle 118 when not in use. Similar to the nozzle 18, the nozzle 118 includes first and second pairs 142, 144 of opposite sides that extend from adjacent the base 141 of recess 140, wherein the first pair of opposite sides 142 diverge outwardly toward the base of the spray head 120 to define the splay angle of the jet of fluid.

The nozzle body 118 also includes two spaced-apart circumferential recesses located about the first conduit section 160, which recesses are dimensioned to respectively receive an O-ring 190. The O-rings 190 are configured to sealingly connect the first conduit section 160 of the nozzle body 118 to the fluid conduit 150 of the spray head. As is explained above, the flow pattern produced by the present shower head 10 and the shower head 100 has been found to be a satisfying alternative to flow patterns produced by other shower heads of the prior art.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A spray head comprising:

an inlet for receiving a fluid; and a plurality of nozzles in fluid communication with the inlet;

wherein each one of the plurality of nozzles is adapted to produce, when in use, a continuous jet of fluid having an elongate transverse cross-section;

wherein each nozzle defines a nozzle opening that is outwardly curved with respect to the base of the spray head such that the respective nozzle has a maximum height with respect to the base at a longitudinal and transverse centre of its respective nozzle opening, and wherein each respective nozzle decreases in height outwardly of the longitudinal and transverse centre, and wherein a recess is disposed about each nozzle opening.

2. The spray head of claim 1, wherein each nozzle has an elongate transverse cross-section having a major axis of a first length and a minor axis of a second length, wherein the first length is greater than the second length.

3. The spray head of claim 2, wherein the elongate transverse cross-section is in the form of a rhombus.

4. The spray head of claim 1, wherein each recess extends into the base of the spray head about its respective nozzle opening such that the nozzle opening is at least partially inset from the base of the spray head.

5. The spray head of claim 2, wherein the recess includes a base, a first pair of opposite sides extending from the base of the recess, and a second pair of opposite sides extending from the base of the recess, and wherein the first pair of opposite sides is perpendicular to the major axis, and the second pair of the opposite sides is parallel to the major axis.

6. The spray head of claim 5, wherein the first pair of opposite sides diverge outwardly toward the base of the spray head to define a splay angle of the jet of fluid.

7. The spray head of claim 6, wherein the splay angle is between approximately 22° and 46°.

8. The spray head of claim 1, wherein each nozzle is inclined inwardly toward a centre of the base of the spray head at an angle of inclination of between approximately 6.5° to 11°.

9. The spray head of claim 5, wherein each nozzle includes a nozzle wall that extends from the base of the recess toward the nozzle opening, wherein the nozzle wall has the maximum height at the longitudinal and transverse centre of the nozzle opening, and wherein the nozzle wall has said decreasing height outwardly of the longitudinal and transverse centre.

10. The spray head of claim 9, wherein the nozzle wall defines an edge surrounding the nozzle opening, wherein the edge is configured to reduce or prevent fluid dripping from the nozzle when not in use.

11. The spray head of claim 2, wherein, together, the elongate transverse cross-section of the nozzle and the outwardly curved nozzle opening are adapted to produce, when in use, the continuous jet of fluid having the elongate transverse cross-section.

12. The spray head of claim 11, wherein each nozzle is configured such that the continuous jet of fluid does not disintegrate into discrete fluid droplets until approximately 30 mm from the base of the spray head.

13. The spray head of claim 1, further including a plurality of fluid conduits in fluid communication with the inlet, each conduit configured to also be in fluid communication with a respective one of the plurality of nozzles.

14. The spray head of claim 13, wherein the spray head further includes a plurality of nozzle bodies, each nozzle body connectable to a respective one of the plurality of fluid conduits, wherein each nozzle body comprises a first conduit section, a second conduit section, and a third conduit section, wherein the first conduit section has a constant cross-section, wherein the second conduit section has a converging cross-section which converges toward the third conduit section, and wherein the third conduit section defines the nozzle opening.

15. The spray head of claim 14, wherein the third conduit section has a longitudinal axis that is approximately perpendicular to a longitudinal axis of the second conduit section.

16. The spray head of claim 14, wherein each nozzle body is removably insertable into a housing of the spray head.

17. The spray head of claim 16, wherein each nozzle body includes a stop on an outer surface thereof to restrict the body from moving with respect to the housing when inserted therein.

18. The spray head of claim 1, wherein the spray head is in the form of a shower head.

* * * * *